May 10, 1955  H. A. THORNBURG  2,707,804
APPARATUS FOR STEAM CURING FROTHED LATEX
Filed April 28, 1951  2 Sheets-Sheet 1
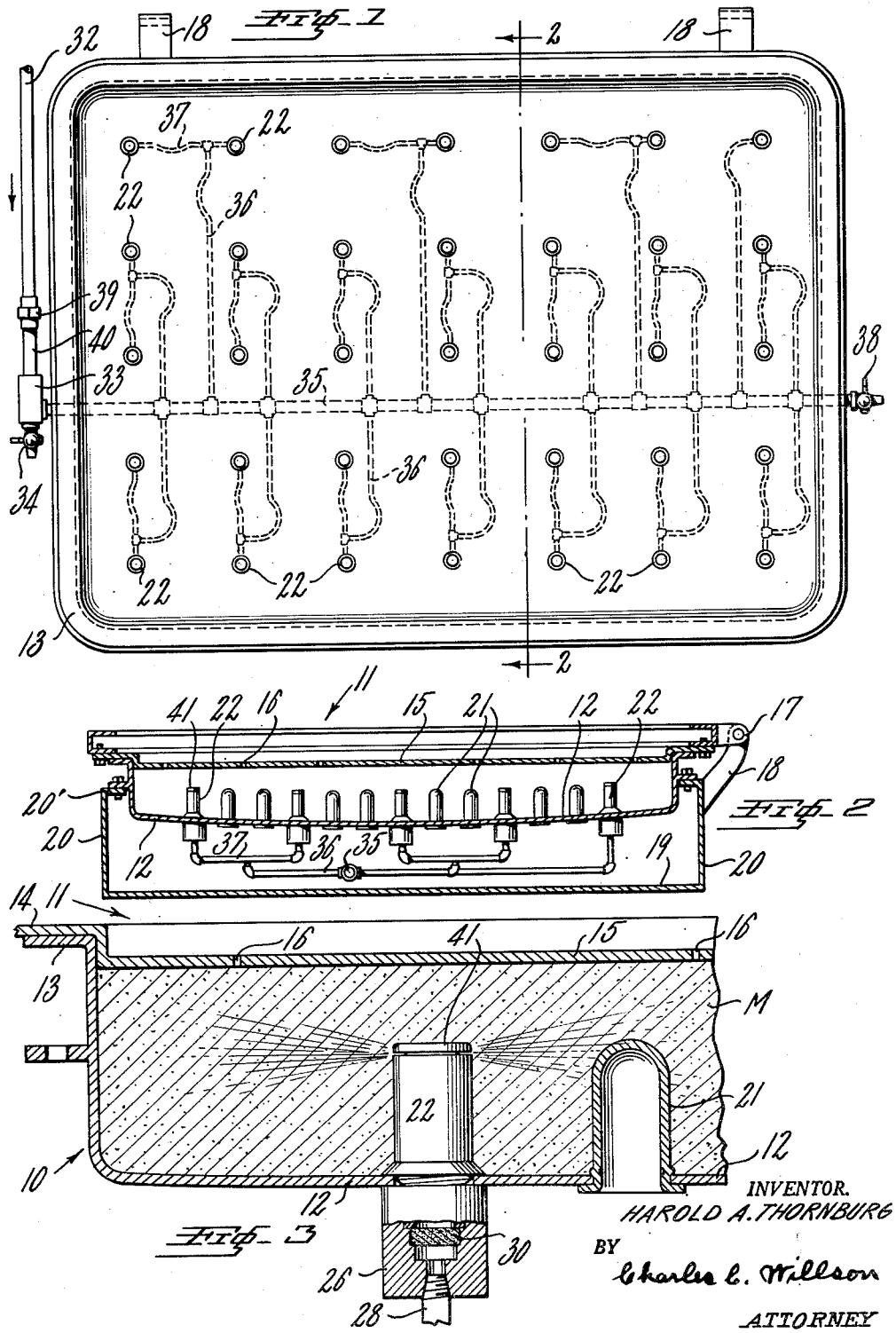
INVENTOR.
HAROLD A. THORNBURG
BY
Charles E. Willson
ATTORNEY May 10, 1955  H. A. THORNBURG  2,707,804
APPARATUS FOR STEAM CURING FROTHED LATEX
Filed April 28, 1951  2 Sheets-Sheet 2
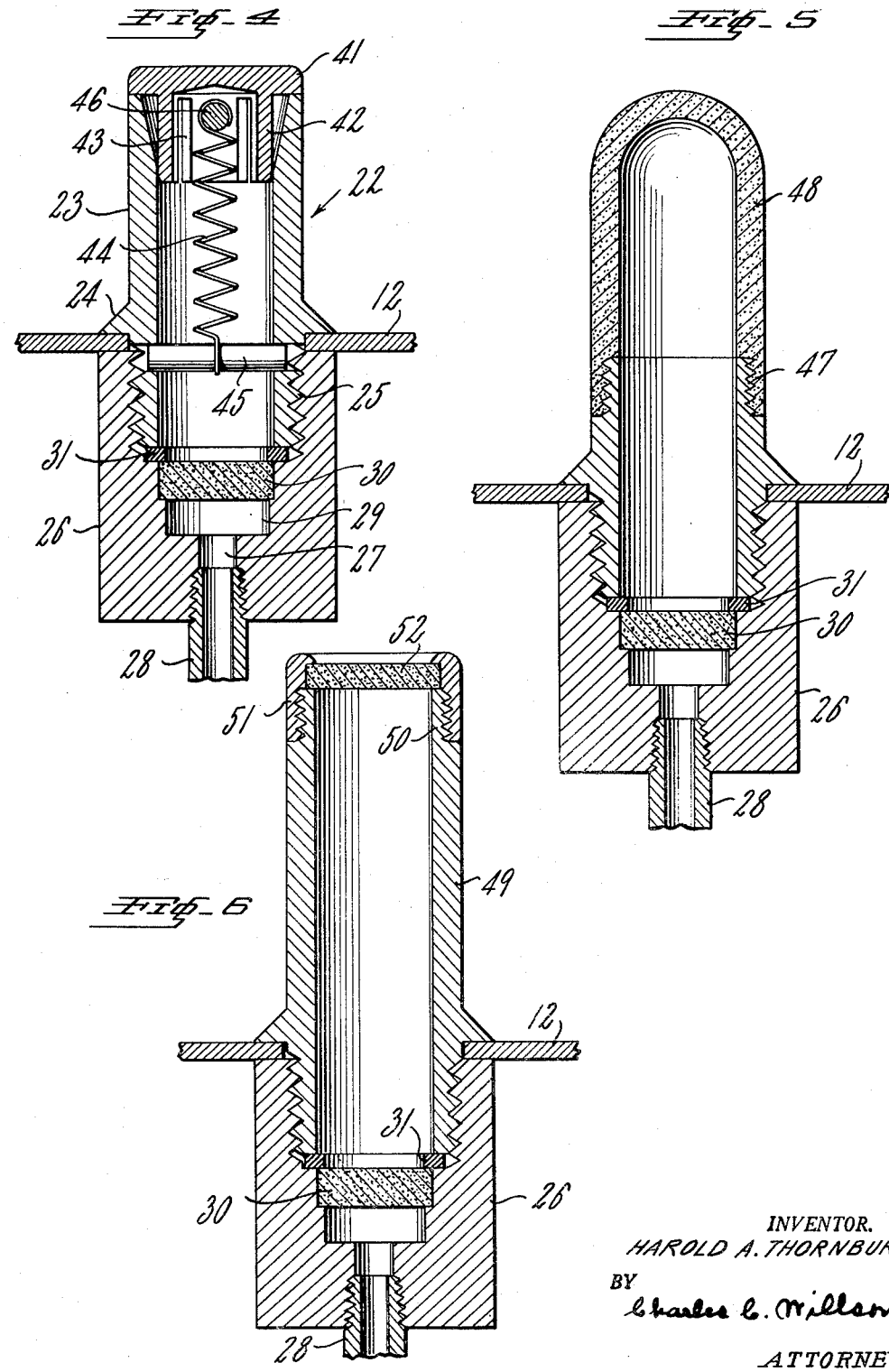
INVENTOR.
HAROLD A. THORNBURG
BY
Charles C. Willson
ATTORNEY United States Patent Office 2,707,804
Patented May 10, 1955

2,707,804

APPARATUS FOR STEAM CURING FROTHED LATEX

Harold A. Thornburg, Brooklyn, N. Y., assignor to United States Rubber Company, New York, N. Y., a corporation of New Jersey Application April 28, 1951, Serial No. 223,465

6 Claims. (Cl. 18—39)

This invention relates to novel apparatus for steam curing or vulcanizing sponge rubber having interconnected cells, and particularly an open cell sponge rubber made from frothed natural or synthetic latex.

Sponge or foamed rubber, as is well known, is made by compounding natural or synthetic rubber latex with certain ingredients, such as vulcanizing agents, accelerators, gelling agents and stabilizers, and then whipping the latex into a foam or froth, that is deposited into mold and allowed to gel by permitting it to rest at room temperature or slightly higher temperature. It is then vulcanized by the application of heat to form a molded sponge rubber article, such as a mattress, pillow, cushion or upholstery padding.

For years the vulcanization of the molded foam or froth was effected by placing a mold containing such foam in a hot oven or vulcanizing chamber, and the time required to effect such vulcanization of the sponge rubber mass varied from about 20 to 60 minutes, depending upon the size of the molded article and particularly its thickness. A large portion of this time is required for the heat to penetrate into the central portion of the sponge mass before this portion begins to cure.

It has recently been determined that such molded latex mass can be cured more quickly and at less expense by introducing live steam into the interior of the mold at a number of points so as to cause the steam to flow rapidly through all portions of the open cell molded mass, and thereby heat the entire foam mass almost immediately to the vulcanizing temperature, and maintain it at this temperature by the continuous flow of steam through the cellular mass. As a result it is possible to cure a cellular latex mass two inches thick in a period of about five minutes and a cellular mass four inches thick in approximately 15 minutes.

In making larger size open-cell sponge rubber articles such as mattresses and seat cushions, it is customary to decrease the weight of such cushion or mattress and increase its resiliency by forming numerous core holes therein which project inwardly from one face or both faces thereof. This is done by providing cores that project from a surface of the metal mold into the interior thereof. It has been found that steam curing of the molded cellular mass can be readily effected by introducing the steam into the cellular mass from certain of such cores, but care must be taken as to the manner in which the steam is introduced into the gelled cellular mass from the cores. It is found that if apertures of any appreciable size are provided in the cores for the passage of steam from the interior of the cores into the latex foam, the freshly poured latex foam tends to creep into these apertures and clog them. This difficulty can be overcome by providing the cores which are to supply the steam to the latex foam with a fine filter surface that acts as a one-way wall to allow the steam to pass therethrough but prevents the latex foam from entering and closing the pores. The steam supplied to the foam should be superheated, and moisture-free and should have a relatively low pressure so as not to cut the foam or blow it away from the cores.

Having in mind the foregoing the present invention contemplates a novel form of apparatus for steam curing frothed latex, and which is adapted to supply clean, dry, superheated steam at various points in the latex foam and to release such steam into the foam at a pressure of less than two pounds per square inch, so that the steam will not strike the foam with sufficient force to injure it, and will not carry enough water into the foam to cause the bubbles to break down. In other words the present invention resides in apparatus for supplying dry superheated steam to a mold filled with latex foam and having means for removing dirt and excess moisture from the steam, and which serves also to reduce the velocity of the steam before it enters the latex foam from the cores that project into the mold at selected points. These results are secured by employing superheated steam and by subjecting it to a two-stage reduction of its pressure. This is preferably accomplished by passing the superheated steam through a filter located adjacent the base of each steam supply core, to filter out dirt at this point and reduce the pressure of the steam as it passes through this filter. Such filter serves also to divide entrained water carried by the steam, so that it will be more readily converted into steam after its passage through the filter. The drop in steam pressure produced by its passage through this filter should be such that when the steam escapes from the interior of the core through its side or end walls, or both, into the foam, it will enter the foam at a pressure of not more than two pounds per square inch, so that it will not break down the latex bubbles adjacent the core. The steam will pass rapidly through the cellular foam to cure the same in a few minutes.

The mold for confining and shaping the mass of frothed latex may have a large number of cores projecting upwardly from the bottom thereof or downwardly from the top thereof, or into the mold from both the bottom and top thereof as desired, but only a few of these cores need be hollow cores which are supplied with steam. Such steam supply cores should be located at carefully selected points within the mold, so that the steam supplied by these hollow cores will pass through all portions of the cellular mass and cure or vulcanize the same uniformly throughout.

The above and other features of the present invention will be further understood from the following description when read in connection with the accompanying drawings, wherein:

Fig. 1 is a top plan view of the interior of a latex foam mould, the top plate of the mold being removed;

Fig. 2 is a section taken on the line 2—2 of Fig. 1;

Fig. 3 on a larger scale is a sectional view through part of the mold of Fig. 2 shown filled with latex foam;

Fig. 4 is a vertical sectional view through the steam supplying core of Fig. 3;

Fig. 5 is a view similar to Fig. 4 showing a modified form of steam supply core; and Fig. 6 is a vertical sectional view similar to Figs. 4 and 5 showing a third form of steam supply core.

The features of the present invention may be employed with latex foam molds of various sizes and shapes, and are shown in connection with the type of mold used to make a latex foam mattress having core holes extending upwardly into the mattress from the lower face thereof.

The latex foam mold shown in sheet one of the drawings comprises a body portion or pan 10 and a top plate or cover 11. The bottom wall 12 of the pan 10 is shown as slightly curved or crowned so as to form a molded mattress that decreases slightly in thickness adjacent its marginal edges. When such a mattress is laid on the bed supporting springs its upper face will sink down slightly near the side edges of the bed and this causes the bed clothing to lie well on the made up bed. The body portion 10 of the mold is shown as having an outwardly extending flange 13 that surrounds the mold, and the cover 11 is shown as having a corresponding flange 14. The major portion of the cover 11 sinks downwardly slightly within the body portion of the mold as indicated by 15. The cover 11 is preferably provided with a number of vent holes or air holes 16 through which air may escape as steam is introduced into the cellular mass. It is desirable that the steam shall condense within the foam mass and not blow out through these vents, because the steam that escapes through these vents is lost without giving up its latent heat. Since it is necessary to remove the cover in order to remove from the mold the vulcanized latex mass M, this cover is shown as secured by the hinges 17 to the hinge brackets 18 projecting from one side of the mold body 10. The mechanism so far described by reference numerals is or may be of well known construction.

The mold body 10, as will be apparent from Fig. 2 is rigidly secured to a receptacle or cradle which has the flat floor 19 and the upwardly extending side walls 20, that are bolted to the body 10 at 20. This cradle 19, 20 provides a flat supporting floor for the complete mold, and holds the crowned mold floor 12 in spaced relation thereto. In the construction shown the space between the crowned floor 12 and floor plate 19 of the cradle is relatively large, so that the steam supplying pipes to be described may be housed therein. The crowned floor 12 of the mold body 10 is shown as having extending upwardly therefrom a large number of cores 21, and a much smaller number of the steam supply cores 22. The cores 21 serve merely to form core holes in the molded mass M and may be formed as heretofore. One of these cores 21 is shown in section in Fig. 3 as made of sheet metal and as rigidly secured by a crimping operation to the crowned floor 12. The other cores 22 serve to form core holes in the molded mass M, and serve also to supply the curing steam to the gelled foamed mass, and they may be variously constructed. One embodiment of a steam supply core constructed in accordance with the present invention is shown in Fig. 4 of the drawing. Another embodiment of such a steam supply core is shown in Fig. 5, and still a third embodiment is shown in Fig. 6. Each of these embodiments has associated with a base portion thereof a filter, to be described, and the purpose of which is to cause a two stage reduction of the pressure of the steam used to cure the foam. The first stage of reduction of the steam pressure takes place in the vicinity of the filter secured at the base of the core, and a second stage takes place as the steam passes from the interior of the core into the latex mass.

The hollow cores 22 which supply steam to the foam mass to cure the same should be so located within the body 10 that they will cause an approximate equal distribution of the curing steam throughout the latex foam mass. To accomplish this one such steam supply core should be located relatively near each corner of the mold, and the cores should also be located in rows relatively near each of the four side walls of the body mold 10, while other hollow cores should be distributed throughout the central portion of the mold. One satisfactory arrangement of these steam supply cores 22 is shown in Fig. 1 of the drawing. It should be mentioned however that the large number of usual cores 21 which are provided to extend upwardly from the floor 12 of the mold have been omitted in Fig. 1 in order that the construction of the present invention may be better shown.

Each steam supply core 22 may have the construction clearly shown in Fig. 4 of the drawing, wherein it will be seen that the hollow core 22 comprises the tubular core member 23 having near its lower ends the flange 24 adapted to engage the upper surface of the floor 12. This tubular portion 23 has its lower end portion threaded as at 25, and this threaded portion is shown as screwed tightly into the nozzle base 26 which serves as a nut that clamps the core 22 firmly to the floor 12, after the threaded portion 25 of the core has been inserted through a hole in such floor. The nozzle base 26 has a relatively small passage 27 extending into the same from the lower end of such base, and this passage is threaded for a short distance, as shown, to receive the threaded end of a small steam supply pipe 28. The central portion of the nozzle base 26 has formed therein the relatively large bore 29 and this bore is shaped to form an annular seat adapted to receive a disk shaped filter pad 30, which is yieldingly clamped in place by the small aluminum ring 31 that rests on such pad and abuts against the lower end of the core 22 as shown in Fig. 4 of the drawing. This pad 30 may be formed of such materials as porous stainless steel, porous aluminum, porous ceramics, filter paper, felt, or metal screen discs. It serves to remove dirt and water and to reduce the steam pressure. This drop in pressure will convert dry saturated steam into superheated steam.

The nozzle base 26 and means for securing the filter pad 30 in place is shown as having the same construction in Figs. 4, 5 and 6 of the drawing. The difference in these three views resides in the construction for discharging the steam from the interior of the core into the latex foam to be cured.

The present invention is concerned primarily with the construction whereby a two-staged reduction is secured in the steam pressure in the area of the steam supply core. It is not particularly concerned with the detailed construction of the means for permitting the steam to escape from the core into the foam, except where such construction provides for low velocity discharge of the steam. The present invention is also concerned with the disposition of the steam supply pipes, the arrangement of water traps, and other apparatus whereby dry saturated steam or superheated steam will be supplied to each nozzle base 26. One form of apparatus provided to supply steam to the cores 22 is shown in Figs. 1 and 2 of the drawing. In Fig. 1 a steam supply pipe 32 is shown for supplying superheated steam to the mold. This pipe preferably leads to a filter 33 used to remove rust and dirt from the steam, and this filter has attached thereto the pet cock 34 through which water may be drained from the pipe 32 and filter 33. The filter 33 is attached to the main pipe 35 which extends the length of the mold 10 within the space between the floors 12 and 19, and this main pipe has extending laterally therefrom the branch pipes 36 which lead to the coupling pipes 37, the ends of which form the above described ends 28 which are screwed into the base portion of the various nozzle bases 26. The coupling pipes 37, branch pipes 36 and main pipe 35 are preferably disposed one below the other as shown in Fig. 2, and the main pipe 35 preferably slopes from one end towards the other to facilitate the drainage of water that accumulates therein towards a pet cock 38 disposed at the far end of the pipe 35 to drain off any water that accumulates in such pipe. The arrangement of the steam supply pipes below the floor 12 of the mold, as shown and just described, is desirable as it makes possible the use of gravity to help get rid of any trapped water. However it is possible in carrying out the present invention to employ steam supply cores extending downwardly from the upper wall of the mold and to supply steam to such cores from pipes disposed above the mold cover.

In practice it is found desirable to move the mold to one position where it is filled with latex foam, and then to another position where it is supplied with the steam for curing the foam. The steam supply pipe 32 is therefore preferably provided with a coupling 39 whereby this pipe may be readily connected to and disconnected from a short pipe 40 extending from the filter 33.

The steam supplied by the pipe 32 is preferably superheated to a temperature of approximately 300° F. When this pipe 32 is first connected to the cold mold some steam will be condensed to water and this water should be drawn off through the pet cocks 34 and 38. As the steam within the pipe 32 travels through the connections above described to the nozzle bases 26 of the various steam cores it will expand a substantial amount as it passes from the small bore 27 to the larger bore 29 and some reduction in pressure will result due to this expansion. A much greater reduction in pressure will occur as the steam passes through the filter pad 30, and particles of water that may be carried in the steam will be broken up into finer particles as they pass through the filter 30 so that they will more readily be converted into steam. Furthermore dirt that remains in the steam will be removed by the filter pad 30. By the time the superheated steam finds its way into the bore of the core 22 its pressure should be reduced to such an extent that as it escapes from the core it will enter the latex foam at a pressure of not more than about 2 lbs. to a square inch. The construction of the nozzle base 26 and filter pad 30 is preferably such that the superheated steam that enters the interior of the core 22 will be clean, free of entrained water and its pressure should be such that as it passes out of the core into the foam it will not injure or displace the foam adjacent the core, but will travel through the cellular mass quickly to vulcanize the same.

Having described the construction and operation of the apparatus shown in Figs. 1, 2 and 3 of the drawing, the different constructions shown in Figs. 4, 5 and 6 of the drawing for discharging the steam from the interior of the core into the foam mass will now be described.

The core 22 shown in Fig. 4 of the drawing has what may be called a pop-off valve comprising a head 41 that is seated on the upper end of the tubular core 22 and a cylinder body 42 which slidably engages the bore of the core. This cylinder body 42 is provided with vertical slots 43 through which steam may escape. The inner bore of the core 22 preferably flares outwardly towards the cap 41 to facilitate the escape of steam. This cap is normally held seated on the upper end of the core by a coil spring 44 one end of which is secured to an anchoring pin 45 within the core and the other end is secured to a pin 46 within the cap. The arrangement is such that when steam is forced into the interior of the core 22 it will unseat the cap and escape into the latex foam as indicated by the outwardly diverging lines in Fig. 3 of the drawing. This escaping steam should not have sufficient velocity to cut or injure the gelled cellular mass, and it should be free of water as water wets the foam and causes it to collapse.

In the embodiment of the invention shown in Fig. 5 the nozzle base and lower portion of the core are shaped the same as in Fig. 4 but the lower portion of the core of Fig. 5 is threaded as indicated at 47 and has screwed thereto the porous cup shaped cap 48 formed of such material as porous stainless steel. Such a cup shaped cap provides a large porous area which is desirable, but such a construction is expensive to make.

In the embodiment of the invention shown in Fig. 6 the hollow core 49 is shown as having its outer end threaded as indicated by 50 to receive the threaded clamping cap 51, and this cap serves to clamp against the outer end of the core 49 the filter disk 52 which may be formed of porous stainless steel.

In each of the constructions shown in Figs. 4, 5 and 6 of the drawing the porosity of the filter pad 30 should be such in relation to the pressure at which the steam is supplied by the pipe 28, that a drop in steam pressure will take place at this stage which is sufficient to cause the steam when its pressure is further reduced, as it escapes from the pop-off valve of Fig. 4 or filter 48 of Fig. 5 or filter 52 of Fig. 6, to enter the latex foam at a pressure of not more than about 2 lbs. per square inch. This will cause the steam to vulcanize the latex foam mass quickly without injuring the foam adjacent the cores.

Having thus described my invention, what I claim and desire to protect by Letters Patent is:

1. In combination with a mold for shaping and vulcanizing a mass of frothed latex, hollow cores projecting into the mold at selected points from a surface thereof and each core having an apertured wall that discharges steam into the latex froth surrounding such cores, means for supplying dry superheated steam to said cores so that it will escape from the cores into the latex froth in a dry condition at a pressure of less than two pounds to cure the froth, including a source of steam supply connected to the base of said cores, and a steam filter adjacent the base of each hollow core and adapted to reduce the steam pressure a substantial amount as it passes from the supply source into the cores.

2. In combination with a mold for shaping and vulcanizing a mass of frothed latex, hollow cores projecting into the mold at selected points from a surface thereof and each core having an apertured wall that discharges steam into the latex froth surrounding such cores, means for supplying dry superheated steam to said cores so that it will escape from the cores into the latex froth in a dry condition at a pressure of less than two pounds to cure the froth, including steam pipes leading to the base of said cores and which are supplied with steam at a pressure of a few pounds, and a steam filter adjacent the base of each core and operable to reduce the pressure of the steam entering the cores nearly to that at which it escapes from the cores into the latex froth.

3. In combination with a mold for shaping and vulcanizing a mass of frothed latex, hollow cores projecting into the mold at selected points from a surface thereof and each core having an apertured wall that discharges steam into the latex froth surrounding such cores, means for supplying dry superheated steam to said cores so that it will escape from the cores into the latex froth in a dry condition at a pressure of less than two pounds to cure the froth, including a main steam pipe supported near said surface and connected by branch pipes to the base of the various hollow cores, means for supplying steam to said main pipe, and a steam filter adjacent the base of each core and adapted to reduce materially the pressure of the steam as it passes from a branch pipe into a core.

4. In combination with a mold for shaping and vulcanizing a mass of frothed latex, hollow cores projecting into the mold at selected points from a surface thereof, each hollow core having a filter surface that contacts the latex froth and through which steam can pass from the interior of the core into the froth in a dry condition to cure the froth, pipes for supplying steam at elevated temperature to said cores, and a second steam filter adjacent the base of each core and adapted to reduce the steam pressure substantially as it passes from said pipes into the hollow cores.

5. In combination with a mold for shaping and vulcanizing a mass of frothed latex, hollow cores projecting into the mold at selected points from a surface thereof and adapted to discharge steam into the interior of the latex mass, means for supplying steam at elevated temperature to the base of said cores so that it will escape at slight pressure from the cores into the latex froth in a dry condition to cure the froth, said supplying means including a steam filter secured adjacent the base of each core and adapted to divide entrained water in the steam and reduce the steam pressure substantially as it passes into each core.

6. In combination with a mold for shaping and vulcanizing a mass of frothed latex, hollow cores projecting into the mold at selected points from a surface thereof and adapted to discharge steam into the interior of the latex mass, means for supplying steam at elevated temperature to said cores so that a two stage reduction in its pressure will occur before it escapes from the cores into the latex froth in a dry condition to cure the froth, including a steam connection for supplying steam to the base of each core and a steam filter secured adjacent the base of each core and adapted to reduce the steam pressure, and apertured means through which the steam passes from the cores into the froth and operable to further reduce the steam pressure.

References Cited in the file of this patent

UNITED STATES PATENTS

| | | |
|---|---|---|
| 1,404,700 | Hardie | Jan. 24, 1922 |
| 1,983,976 | Garvey | Dec. 11, 1934 |
| 2,266,831 | Tegarty | Dec. 23, 1941 |
| 2,378,586 | Schultz | June 19, 1945 |
| 2,396,406 | Anderson | Mar. 12, 1946 |
| 2,595,964 | Lovell | May 6, 1952 |
| 2,611,926 | Grannis | Sept. 30, 1952 |